United States Patent [19]

Carlier et al.

[11] 4,039,839

[45] Aug. 2, 1977

[54] THORIUM TETRABROMIDE SCINTILLATORS AND RADIATION DETECTION AND MEASUREMENT THEREWITH

[75] Inventors: Roger Carlier, Breuillet Port-Sud; Michel Hussonois, Gif-sur-Yvette; Michel Genet, Orsay; Jean-Claude Krupa, Bures-sur-Yvette, all of France

[73] Assignee: Agence Nationale de Valorisation de la Recherche (ANVAR), Neuilly-sur-Seine, France

[21] Appl. No.: 698,262

[22] Filed: June 21, 1976

[30] Foreign Application Priority Data

June 25, 1975  France .................................. 75.19961

[51] Int. Cl.$^2$ .............................................. G01J 1/58
[52] U.S. Cl. .................................. 250/483; 250/390; 250/458
[58] Field of Search ............... 250/390, 462, 483, 484, 250/390, 331, 372, 458

[56] References Cited

U.S. PATENT DOCUMENTS

| 3,030,509 | 4/1962 | Carlson ............................. 250/462 |
| 3,408,302 | 10/1968 | Borchardt .......................... 250/483 |
| 3,408,303 | 10/1968 | Borchardt .......................... 250/483 |

*Primary Examiner*—Harold A. Dixon
*Attorney, Agent, or Firm*—William R. Woodward

[57] ABSTRACT

Thorium tetrabromide has been found to exhibit fluorescence and radioluminescence with emission of blue light in the range from 3400 to 4800 A with a maximum around 4000 A in response to electromagnetic waves shorter than 3000 A, whether ultraviolet, X or gamma rays and also in response to energetic charged particle radiation, such as alpha rays, beta rays, protons and heavy ions. Because of the radioactive decay of thorium, there is a background autoluminescence. Crystals of thorium tetrabromide are transparent to its luminescence radiation and are particularly suitable for radiation detectors and measurements, frequency converter, standards, radioisotopic microgenerators of electricity, and the like. They are also useable as neutron flux detectors, for thermal and fast neutrons because the component elements of the crystal react with neutrons to respectively produce neutrons activation reactions and fission reactions.

14 Claims, 1 Drawing Figure

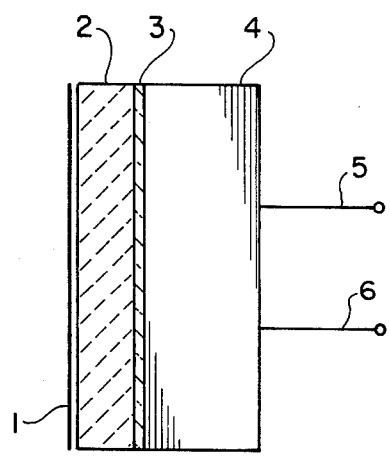

THORIUM TETRABROMIDE SCINTILLATORS AND RADIATION DETECTION AND MEASUREMENT THEREWITH

This invention relates to light emitting materials and in particular to materials capable of emitting light in a characteristic spectral region in response to a wide range and variety of incident radiation.

Materials are referred to as light-emitting or as luminescent when they are able to restore in the form of light radiation a part of the energy that they have absorbed in various ways. In a general way, the presistence of the light emission after the cessation of the excitation is characteristic of luminescence. When the emission of light persists only a short time after the suppression of the exciting light or other radiation, the material in question is usually referred to as fluorescent. In the particular case of luminescence resulting from the passage of ionizing particles or the absorption of gamma rays, the material is more specifically referred to as a scintillator or as a radioluminescent material, these terms having been particularly associated with research on radioactive substances.

The present invention relates to properties of a new material which is both fluorescent and radioluminescent, producing visible light not only under excitation from ultraviolet and X-rays, but also under excitation by gamma rays and by alpha and beta particles, protons, neutrons and ions heavier than alpha particles, which may generally be designated as heavy ions. It has become common to refer to materials that emit light in response to electromagnetic radiation and to particle radiation in general as phosphors or scintillators.

SUMMARY OF THE INVENTION

The new phosphor that is both fluorescent and radioluminescent discovered by the present invention consists essentially of thorium tetrabromide, of which the formula is $ThBr_4$. Thorium tetrabromide has been found, according to the present invention, to be luminescent in various different states, and in particular in powder form, in polycrystalline solid form, such as is obtained by ordinary solidification after fusion, and in monocrystalline form. The luminescent properties of thorium tetrabromide discovered by the present invention may be summarized as follows. If the material is excited by electromagnetic rays of wavelength less than 3000 A, whether ultraviolet rays, X-rays or gamma rays, or by particles such as alpha rays, beta rays and ions heavier than alpha rays, it emits photons of blue light of which the spectrum extends from 3400 A to 4800 A centered on a mean wavelength of 4000 A. The quantitative maximum yield of fluorescence is found when the excitation is provoked by ultraviolet rays of wavelength $\lambda = 2700$ A. This emission spectrum has the property of not varying even towards low temperatures and of remaining stable between 300° K and 77° K, which is particularly interesting for certain applications. Moreover, as in the case of many luminescent compositions, there is a temperature above which a complete extinction of fluorescence is observed; in the present case this temperature is in the neighborhood of 350° K for the material of the present invention, and the phenomenon is reversible in the sense that fluorescence reappears if the material is again cooled down to ambient temperature.

Research on the radioluminescence (alpha, beta, gamma, X) of thorium tetrabromide by the present inventors has led to the determination that its scintillation period is of the order of 3 microseconds. It is also worth noting that thorium and its products of radioactive decay being themselves radioactive emitters of alpha, beta and gamma rays, thorium tetrabromide is naturally luminescent by auto-excitation.

The very high resistance of thorium tetrabromide to ionizing radiations (at least 100 times that of sodium iodide NaI, for example) when used as a phosphor, makes it possible to use the new material without difficulty in combination with radioactive exciting materials even of considerable activity.

Furthermore, the solid form of thorium tetrabromide, particularly in monocrystalline form, has the highly interesting property of being transparent to its own emission rays, thus eliminating a factor that constitutes an important obstacle to the utilization of the luminescent properties of other materials.

Finally, the high atomic number of thorium, $Z = 90$, is also a condition favorable to its utilization as a gamma ray scintillator, since it is known that in this case, the probability of interaction of a gamma ray with an atom varies with the fourth power $Z^4$ of its atomic number. This is likewise a marked advantage in comparison to sodium iodide, of which the atomic number is $Z = 53$.

It follows that thorium tetrabromide, by virture of the present invention, is useful as a detector of electromagnetic and particle radiation. In addition, by virtue of its newly discovered properties, thorium tetrabromide is likewise useful as a constituent of a radiation or fluorescence standard, of an electric microgenerator, of an energy detector for measuring charged particle radiation, or of a device for measuring the intensity or energy of electromagnetic radiation by frequency conversion and of a neutron flux dosimeter.

The invention is further described in more detail below, partly by reference to the single FIGURE of the drawing which represents diagrammatically a radioisotopic microgenerator of electricity utilizing thorium tetrabromide, a photodiode, and a radioactive source.

PREPARATION OF THORIUM TETRABROMIDE

Thorium tetrabromide can be prepared by direct synthesis under vacuum from its component elements, bromine and thorium.

EXAMPLE I

Approximately 1.5kg $ThBr_4$ is produced, principally in the polycrystalline form, by the reaction of $Br_2$ with Th metal. The reaction takes place between a small rod (600g) of metallic thorium and bromine vapors at 900° C. Thorium suspended in a carbon "basket" is placed in a tube consisting of pyrex ends and a quartz center. One end of the tube contains degassed liquid bromine and the other end of the tube is used to recover $ThBr_4$ as a powder. The apparatus is evacuated to a pressure of $10^{-4}$mm Hg, and the center part of the quartz tube (containing the Th metal) is heated by an electric furnace to 900° C – 950° C. After this step, pumping is stopped and gaseous bromine ($P_{Br_2} \sim 100$mm Hg at room temperature) is admitted to the hot zone. The reaction takes place immediately with the product $ThBr_4$ subliming out of the hot zone and forming on the walls of the tube approximately 10cm below the hot zone. Some $ThBr_4$ as powder falls to the bottom of the tube. The reaction yield is between 80 - 90%.

The result of synthesis of the bromide is generally a powder and a polycrystalline solid which can be fused at 680° C. The polycrystalline solid can be converted into a single crystal of thorium tetrabromide by the method of Bridgman, that is, by passing the sample through an isothermal oven held at an elevated temperature of the order of 750° C, the sample being made to pass through the oven at very slow speed. Thorium tetrabromide is highly hygroscopic and must consequently be preserved in a dry environment or otherwise sealed off from access of humidity.

As mentioned before, the material itself is useful, preferably in a transparent capsule for protection against humidity-induced accumulation of water, as a radiation detector, arranged to be observed either visually or through measuring instruments or systems responsive to the blue light emitted by the material.

The newly discovered properties of thorium tetrabromide can also be utilized in a number of combinations of the material with other materials and/or auxiliary devices.

A fluorescence standard can be made by doping thorium tetrabromide with atoms of an or several elements which function as a fluorescent photoactivator mixed with one or more radioactive elements serving to excite the levels of fluorescence of the fluorescent photoactivator elements. The doped material may be prepared in polycrystalline or in monocrystalline state, according to the requirements of the application.

The photoactivator elements with which thorium tetrabromide may be doped to produce a fluorescence standard is preferably fluorescent elements either of the lanthanide series or of the actinide series, mixed with a source of beta rays, such as (promethium) $^{147}Pm$, or alpha rays, such as $^{238}Pu$.

In such a fluorescence standard, the thorium tetrabromide serves only as a transfer matrix to carry over the energy of the exciting beta rays to the lanthanide or actinide element. The $^{147}Pm$ atoms, as well as the lanthanide or actinide atoms, occupy a small portion of the metal atom positions in the bromide crystal or crystals as the result of the doping procedure. It is advantageous to choose the photoactivator element in terms of the narrowness of its spectral lines of fluorescence, since the precision of the wavelength standard produced depends directly on the definition with which the spectral lines are present. Moreover, it is likewise of interest to choose an element of which the wavelengths of fluorescence are at some distance from the region of 4000 A, so as to avoid confusion with the fluorescence line or lines of thorium tetrabromide which, in any event, will always be present. It is sufficient for the doping elements to be present in a proportion of the order of a few thousand parts per million.

Another utilization of the newly discovered properties of thorium tetrabromide is the provision of a radioisotopic microgenerator of electricity. For this purpose, a single crystal of thorium tetrabromide is associated with a radioactive source of alpha or beta rays and with a photodiode. The alpha or beta rays excite the fluorescence of the thorium tetrabromide crystal, which fluorescence in turn excites the photodiode to produce an electric potential in response. A number of photodiodes thus excited may be connected in series, in parallel or in series-parallel combinations in such a way as to provide an output of several microwatts of electric power, the entire collection of microgenerator diodes and their exciting crystals and sources occupying a very small volume. Such extremely small microgenerators are particularly useful in cardiology for stimulating the heartbeat of a patient. The radioactive source of alpha or beta rays in such a microgenerator according to the present invention may be either a discrete unit adjacent to the thorium tetrabromide crystal or it may be integrated into the crystal itself at the time of its manufacture, i.e. by doping the crystal wth a radioactive element. If the source of radioactivity is integrated into the crystal, more of the crystal faces are made available for illuminating photodiodes and a single crystal can then be used to excite two or possible more, photodiodes.

The thorium tetrabromide luminescent material of the present invention can also be used to detect and measure the energy of charged particles such as alpha rays, beta rays, protons and ions heavier than alphas by associating a crystal of thorium tetrabromide with a photomultiplier followed by electric circuits of the kind used in nuclear energy spectrometry.

The newly discovered luminescent properties of thorium tetrabromide can be used according to the invention to measure the intensity or the energy of electromagnetic radiation by frequency conversion. Thorium tetrabromide subjected to ultraviolet, X or gamma radiation acts as a veritable frequency converter, since the energy of variable wavelength that is received is reemitted in visibly luminous form at a wavelength in the neighborhood of 4000 A. It is therefore possible according to the invention to measure by this means the intensity of electromagnetic radiation of wavelengths less than 3000 A by making it interact with a crystal of thorium tetrabromide associated with a photodiode arranged to be excited by the visible luminescence of the thorium tetrabromide. Of course, there is a background noise of such an assembly resulting from the natural radioactivity of thorium and hence only rather high levels of intensity can be measured this way. When the arrangement is used to measure sufficiently energetic gamma rays (energy exceeding 3 MeV), it is possible to replace the photodiode by a classical type of photomultiplier and to carry out gamma ray spectrometry.

These various applications of the newly discovered properties of thorium tetrabromide will be better understood by more specific examples of the above-mentioned devices. Thus, the previously mentioned fluorescence standard according to the invention comprises a supporting matrix of thorium tetrabromide doped with a photoactivator element, such as an element of the lanthanide or actinide series in the trivalent or tetravalent state. In such a standard, the thorium tetrabromide plays the role of a conducting medium for the energy to carry over the energy of the rays of nuclear origin produced by the radioactive elements towards the fluorescent photoactivator of which it provokes the excitation. In these conditions, when the levels of the latter element are excited by the aid of a radioisotope that is an emitter of beta rays, as for example $^{147}Pm$, it is then possible to provoke the fluorescence of the photoactivator element that is specifically chosen in terms of the region of wavelength that it is desired to obtain for the fluorescence standard. For example, it is possible to utilize as a lanthanide element the $Eu^{3+}$ ion of which the emission spectrum is situated in large part between 4000 A and 7000 A in the form of well-known emission lines relatively narrowly localized. For example, a composition comprising 1‰ in mass of Eu³⁺ and 1 ‰ in mass of ¹⁴⁷Pm in thorium tetrabromide makes it possible to provide an entirely satisfactory fluorescence standard. 1 ‰ means 1 part per thousand.

EXAMPLE II

ThBr₄ in polycrystalline form and Eu₂O₃ sesquioxide in the mass ratio of 1 part part per thousand are introduced in a vacuum sealed quartz container. The mixture is fused at 750° C and is slowly lowered through a sharp temperature gradient in order to obtain, by the Bridgman method, a doped single crystal.

The above-mentioned illustration of the use of the newly discovered properties of thorium tetrabromide to provide a radioisotopic microgenerator of electricity, particularly useful for medical applications, involves the association of a radioactive source emitting alpha or beta rays with a long half-life with a crystal of thorium tetrabromide so as to provide an emitter of light of wavelength of about 4000 A with a half-life directly related to the half-life of the selected radioactive element. If this light source is then associated with a photodiode having the best possible energy conversion yield at 4000 A and the weakest possible dark current, it is possible thus to provide a radioisotopic microgenerator of electricity operating by radiophotovoltaic conversion of nuclear energy.

Such a microgenerator is illustrated in highly diagrammatic fashion in FIG. 1 and comprises a radioactive alpha or beta ray source 1, a thorium tetrabromide monocrystal 2, a protective quartz plate 3 and a photodiode 4 with its output electrodes 5 and 6. In such a device, the surfaces of the source 1, of the crystal 2 and of the photodiode 4 are of the order of magnitude of 1 cm², the respective thicknesses of the different components are of the order of 5 microns for the source 1, 100 microns to 1 mm for the crystal 2, 100 microns for the quartz plate 3, and 200 microns for the photodiode 4, so that a total thickness of the order of 500 microns is reached. By utilizing a radioactive source 1 of which the power is of the order of 400 microwatts/cm², it is possible to obtain a power in photons of the order of 20 microwatts, corresponding at the output of the diode to 2 microwatts of electricity if a photodiode is used of which the yield is 10% at this level of illumination. This represents the power of a unit such as that illustrated in FIG. 1, it being well understood that a more powerful generator could be constituted by connecting up several units of this type in series, in parallel or in series-parallel combinations.

In the particular case in which the radioactive source 1 were incorporated into the crystal 2 at the time of making the monocrystal 2, the crystal wafer 2 could receive a photodiode on each one of its faces and the electric capacity of each unit would then be still greater. Practically all the radioactive elements that are emitters of alpha or beta rays can be regarded as suitable for the source 1, but at the present state of experimental knowledge, it would appear that ⁹⁰Sr, ¹⁴⁷Pm, ²⁴⁴Cm and ²³⁸Pu are the most appropriate for obtaining the necessary excitation of the thorium tetrabromide monocrystal. The photodiodes used can be, for example, junctions made by implantation in ultrapure silicon, the essential condition to be produced being that the junctions should of course have a relatively high photovoltaic conversion yield for electromagnetic radiation of the wavelength order of 4000 A.

In the case of the previously mentioned possibility of utilizing thorium tetrabromide as a general frequency converter for measuring the intensity of electromagnetic radiation, this is particularly practical when the radiation measured has a wavelength lower than 3000 A. Such radiation is caused to interact by a crystal of thorium tetrabromide which is exposed to the radiation and is adjacent to the input of a photodiode. The greater or less electric intensity (current) delivered by the photodiode in response to the luminescence of the thorium tetrabromide is directly characteristic of the intensity of electromagnetic radiation received by the crystal. Of course, thorium tetrabromide being itself an autoscintillator, as has already been mentioned, only fairly high intensities of radiation can be measured in this way, since the luminescence resulting from the internal radioactivity of thorium must be negligible in comparison. In the case of low intensity gamma rays of an energy greater than 3 MeV, it is even possible to associate the thorium tetrabromide crystal directly with a photomultiplier and the whole will then function as a classical nuclear energy detector.

Thorium tetrabromide can likewise be utilized as a detector of energetic charged particle radiation such as alpha rays, beta rays, prontons and ions heavier than alphas, because of the good behavior of thorium tetrabromide when exposed to energetic radiation. In fact, when such energetic rays interact with a crystal of thorium tetrabromide, the energy of these particles is absorbed by the crystal and provokes the fluorescence of the latter, which re-emits the energy on a wavelength in the neighborhood of 4000 A in photons of which the quantity is characteristic of the energy of the incident absorbed particles. Under these conditions, it is therefore possible to carry out alpha ray spectrometry, provided that alpha rays of energy greater than 10 MeV are utilized, since the natural radioactivity of the thorium produces a background noise of low and medium energy that is unavoidable. In the domain of detection of heavy ions such as, for examples, C⁴⁺ and Ar¹³⁺ of high energy (6 to 8 MeV per nucleon, for example) a visual indication of the ions beam is obtainable in the following way. There is connected to the thorium tetrabromide monocrystal a light guide composed of a large number of optical fibers of small diameter which transfer the luminous information to a photodetector (of the vidicon type) forming part of a television system that provides an output image on a television screen.

Finally, thorium tetrabromide can be used in accordance with the present invention for a dosimeter, for example for gamma rays or even for neutrons. Whether it is in powder form, polycrystalline (as in a solid after fusion) or monocrystalline, thorium tetrabromide when irradiated by a heavy dose of gamma radiation from ⁶⁰Co (several hundred Megarads) emits after such radiation a quantity of light proportional to the dose that it has received. The period of fading persistence of this luminosity is about 80 hours.

If thorium tetrabromide is irradiated by a neutron flux in a nuclear reactor, the following reactions (n-gamma) of bromine and thorium are observed:

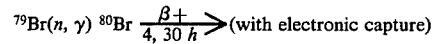
⁷⁹Br(n, γ) ⁸⁰Br $\xrightarrow[4, 30\ h]{\beta+}$ (with electronic capture)

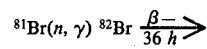
⁸¹Br(n, γ) ⁸²Br $\xrightarrow[36\ h]{\beta-}$

-continued

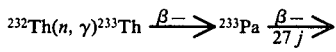

The various positive or negative beta radiations that are emitted by the produced radionucleides lead to a luminescence of the thorium tetrabromide. The cross-sections of these different nuclear processes are known and, therefore, after calibration, it is possible to calculate the activity of the radioactive element or elements that provoke the luminescence in terms of the light emitted by the crystal after irradiation and also thus to determine the neutron flux of the reactor at the moment and at the place where the crystal had been irradiated for a defined period of time.

It must be understood that the above-mentioned utilizations of thorium tetrabromide are, in principle, possible with powdered thorium tetrabromide as well as with monocrystalline or polycrystalline solid bodies of the material.

Although several different utilizations of the newly discovered properties of thorium tetrabromide have been particularly referred to, it will be understood that other utilizations are also possible in accordance with the present invention.

We claim:

1. A fluorescent and radioluminescent material having a characteristic blue emission in the region from 3400 A to 4800 A due to excitation by electromagnetic radiation in the range comprising ultraviolet light, X and gamma rays and to particle radiation including alpha and beta rays and protons, neutrons and heavy ions, said material essentially consisting of thorium tetrabromide, $ThBr_4$.

2. A fluorescent and radioluminescent material as defined in claim 1, in which the thorium tetrabromide is in a powdered condition.

3. A fluorescent and radioluminescent material as defined in claim 1, in which the thorium tetrabromide is a polycrystalline solid.

4. A fluorescent and radioluminescent material as defined in claim 1, in which the thorium tetrabromide is in the form of a single crystal of thorium tetrabromide.

5. A fluorescence standard comprising thorium tetrabromide doped with a fluorescent photoactivating agent mixed with a least one radioactive element suitable for activating the fluorescence levels of said photoactivating element.

6. A fluorescence standard as defined in claim 5, in which said photoactivating agent dopant consists of one or more elements selected from the group consisting of fluorescent elements in the lanthanide or actinide series or other series and in which the radioactive material is an emitter of beta rays such as $^{147}Pm$.

7. A fluorescence standard as defined in claim 6, in which the photoactivating agent dopant is $Eu^{3+}$ present in a proportion by weight relative to the thorium bromide of approximately one tenth percent.

8. A method of measuring the activity or the quantity of a fluorescent photoactivating agent by mixing said fluorescent photoactivating agent with at least one radioactive material suitable for activating the fluorescence levels of said photoactivating agent, doping thorium tetrabromide therewith and measuring the fluorescence characteristics of said photoactivating agent.

9. An electrical microgenerator of the radioisotope type, essentially consisting of a photodiode which detects the photons emitted from the thorium tetrabromide source when such source is activated by a radioactive material in its immediate vicinity and photodiode thereby connects the photons to produce an electrical current.

10. A microgenerator as defined in claim 9, in which the radioactive source is exterior to the thorium tetrabromide.

11. A microgenerator as defined in claim 9, in which the radioactive material constituting the radioactive source is incorporated in the mass of the thorium tetrabromide.

12. A method of measuring the energy distribution of alpha ray particles, beta ray particles, heavy ions and protons, comprising the steps of:
exposing a material consisting essentially of thorium tetrabromide to said particles, detecting the intensity of the fluorescence of the thorium tetrabromide by means of a photomultiplier photocell and indicating amplified detected intensity in correlation with energy distribution by means of electronic circuits.

13. A method of measuring the intensity of electromagnetic radiation by exciting with said radiation the thorium tetrabromide which emits blue light, and measuring the intensity of said emitted blue light.

14. A method of measuring gamma rays or neutrons by irradiating thorium tetrabromide with said radiations or particles and measuring the integrated blue light emission after irradiation.

* * * * *